(12) United States Patent
Becklin

(10) Patent No.: US 8,016,966 B2
(45) Date of Patent: Sep. 13, 2011

(54) STRENGTHENED EQUIPMENT CASES AND METHODS OF MAKING SAME

(75) Inventor: Dennis M. Becklin, Grants Pass, OR (US)

(73) Assignee: Environmental Cotainer Systems, Grants Pass, OR (US)

( * ) Notice: Subject to any disclaimer, the term of this patent is extended or adjusted under 35 U.S.C. 154(b) by 284 days.

(21) Appl. No.: 12/259,912

(22) Filed: Oct. 28, 2008

(65) Prior Publication Data

US 2010/0102055 A1  Apr. 29, 2010

(51) Int. Cl.
  *B32B 37/00* (2006.01)
(52) U.S. Cl. ..... 156/73.5; 156/293; 156/298; 156/303.1
(58) Field of Classification Search .............. 156/73.5, 156/293, 297, 298, 299, 303.1, 308.2, 309.6; 264/68, 69; 228/112.1, 114.5, 2.1, 2.3
See application file for complete search history.

(56) References Cited

U.S. PATENT DOCUMENTS

| | | |
|---|---|---|
| 0,879,455 A | 2/1908 | Frost |
| 2,695,115 A | 11/1954 | Roop |
| 2,849,151 A | 8/1958 | Heil |
| 3,103,278 A | 9/1963 | Kuzma et al. |
| 3,117,692 A | 1/1964 | Carpenter et al. |
| 3,383,009 A | 5/1968 | Weikert |
| 3,391,824 A | 7/1968 | Wiseman |
| 3,419,184 A | 12/1968 | Asenbauer |
| 3,481,502 A | 12/1969 | Slayman |
| 3,616,943 A | 11/1971 | Brink |
| 3,754,645 A | 8/1973 | Kilroy |
| 3,756,396 A | 9/1973 | Kilroy |
| 3,759,416 A | 9/1973 | Constantine |
| 3,968,879 A | 7/1976 | Lucas, Sr. et al. |
| 4,287,997 A | 9/1981 | Rolfe et al. |
| 4,655,360 A | 4/1987 | Juhanson |
| 4,765,252 A | 8/1988 | Shuert |
| 4,832,200 A | 5/1989 | Deaton et al. |
| 4,848,605 A | 7/1989 | Wise |
| D333,094 S | 2/1993 | Zutler |
| 5,203,494 A | 4/1993 | Blomfield |
| 5,392,945 A | 2/1995 | Syrek |
| D361,715 S | 8/1995 | Haupert |
| 5,454,477 A | 10/1995 | Bornhorst et al. |
| 5,641,090 A | 6/1997 | Kowalski et al. |
| 5,718,350 A | 2/1998 | Williams |
| 5,769,230 A | 6/1998 | Koefelda |
| 5,779,051 A | 7/1998 | Boutin |
| 6,004,412 A * | 12/1999 | Grigory et al. ............... 156/73.5 |
| 6,021,916 A | 2/2000 | Stolzman |
| 6,085,467 A | 7/2000 | Packrall et al. |
| 6,186,345 B1 | 2/2001 | Robertson |
| 6,237,758 B1 | 5/2001 | Hsu |
| D446,017 S | 8/2001 | Koefelda |
| 6,308,858 B1 | 10/2001 | Koefelda |
| 6,367,630 B1 | 4/2002 | Elskamp |

(Continued)

*Primary Examiner* — James Sells
(74) *Attorney, Agent, or Firm* — Lowe Graham Jones PLLC

(57) ABSTRACT

A stackable equipment container includes at least one reinforcement panel made of a composite material attached to the container on an interior surface proximate an arrangement of stackable elements. The panel is attached to the container using spin-weld plugs installed at a high rotation rate. Through the installation of the spin-weld plugs, the panel becomes fused or welded to the container. In one embodiment, the rotation rate of the spin-weld plugs during installation is sufficient to cause the panel and container to locally vulcanize with each other and with the spin-weld plugs. The panel provides the container with increased strength and operates to minimize or eliminate distortion of the stackable elements.

10 Claims, 4 Drawing Sheets

U.S. PATENT DOCUMENTS

| | | |
|---|---|---|
| 6,371,364 B1 | 4/2002 | Maillot et al. |
| 6,457,599 B1 | 10/2002 | Apps et al. |
| 6,585,090 B2 | 7/2003 | Harvey |
| 6,662,950 B1 | 12/2003 | Cleaver |
| D500,924 S | 1/2005 | Martin et al. |
| 7,163,122 B2 | 1/2007 | Elder et al. |
| 2004/0178208 A1 | 9/2004 | Leba et al. |
| 2006/0254947 A1 | 11/2006 | Rogers |

* cited by examiner

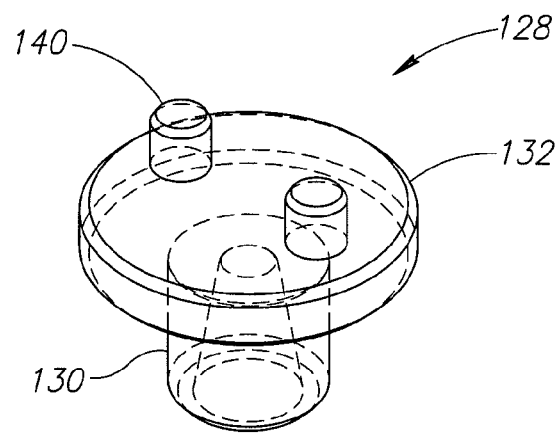
FIG.4A
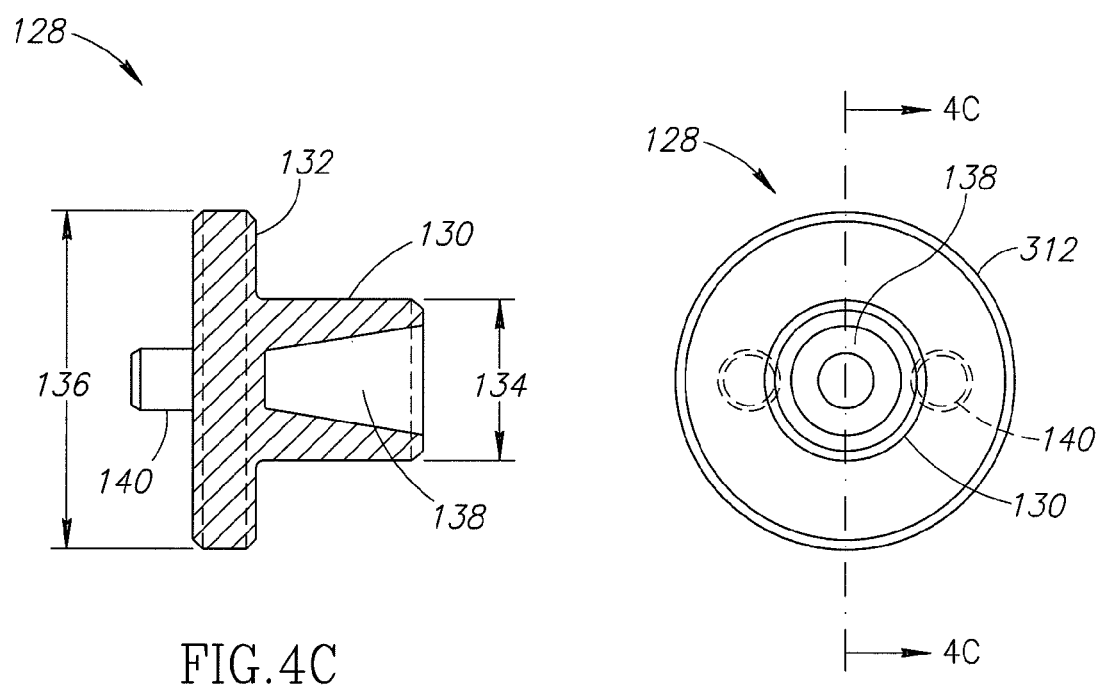
FIG.4C
FIG.4B

STRENGTHENED EQUIPMENT CASES AND METHODS OF MAKING SAME

BACKGROUND OF THE INVENTION

Various types of containers for moving equipment, such as electronics equipment or other types of delicate devices and systems, been employed in military and commercial environments. Many of these containers include stackable elements arranged so the containers may be stacked one on top of another. The stackable elements operate the keep an upper situated container from laterally sliding off of a lower situated container. In addition, some of these containers are rotomolded using a linier low density polyethylene (LLDPE) material. Because the containers are often used in transit operations, for example on ships, trucks, airplanes and other vehicles, the containers may be subjected to different temperature conditions over their operational life. However, one drawback of the rotomolded containers made from the LLDPE is these containers may thermally expand under higher temperatures or thermally contract under lower temperatures. This thermal expansion or contraction results in distortion of the case, especially distortion of the stackable elements, and makes the containers difficult to stack properly.

SUMMARY OF THE INVENTION

A stackable equipment container includes at least one reinforcement panel made of a composite material attached to the container on an interior surface proximate an arrangement of stackable elements. The panel is attached to the container using spin-weld plugs installed at a high rotation rate. Through the installation of the spin-weld plugs, the panel becomes fused or welded to the container. In one embodiment, the rotation rate of the spin-weld plugs during installation is sufficient to cause the panel and container to locally vulcanize with each other and with the spin-weld plugs. The panel provides the container with increased strength and operates to minimize or eliminate distortion of the stackable elements.

In one example of the invention, a stackable equipment container includes a case having a top portion with an exterior surface including a plurality of stackable elements and a bottom portion with an exterior surface including a plurality of complementary stackable elements; a plurality of spin-weld plugs; and at least one composite panel coupled to an interior surface of the case using the spin-weld plugs, which are installed at a rotation rate sufficient to weld at least one composite panel to the case.

In another example of the invention, a method for strengthening a stackable equipment container, the method includes obtaining a case having a top portion with an exterior surface including a plurality of stackable elements and a bottom portion with an exterior surface including a plurality of complementary stackable elements; positioning at least one composite panel adjacent an interior surface of the case; and installing a plurality of spin-weld plugs into the sheet and the case at a desired rotation rate sufficient to weld the sheet to the case.

BRIEF DESCRIPTION OF THE DRAWINGS

In the drawings, identical reference numbers identify similar elements or acts. The sizes and relative positions of elements in the drawings may not be necessarily drawn to scale. For example, the shapes of various elements and angles may not be drawn to scale, and some of these elements may be arbitrarily enlarged or positioned to improve drawing legibility.

The preferred and alternative embodiments of the present invention are described in detail below with reference to the following drawings.

FIG. 4A shows an isometric view of a spin-weld plug according to an embodiment of the present invention;

FIG. 4B shows a bottom plan view of the spin-weld plug of FIG. 4A; and

FIG. 4C shows a cross-sectional view of the spin-weld plug of FIG. 4A taken along line 4C-4C of FIG. 4B.

DETAILED DESCRIPTION OF THE PREFERRED EMBODIMENT

In an example of the present invention, a stackable equipment container includes at least one reinforcement panel made of a composite material. The panel is attached to the container using spin-weld plugs installed at a high rotation rate. Through the installation of the spin-weld plugs, the panel becomes fused or welded to the container. In one embodiment, the rotation rate of the spin-weld plugs during installation is sufficient to cause the panel and container to locally vulcanize with each other and with the spin-weld plugs. The panel provides the container with increased strength and operates to minimize or eliminate distortion of the stackable elements of the container.

In the following description, certain specific details are set forth in order to provide a thorough understanding of various embodiments of the invention. However, one skilled in the art will understand that the invention may be practiced without these details. In other instances, well-known structures associated with stackable equipment containers, composite panels or sheets, spin-weld plugs and methods of assembling the same have not necessarily been shown or described in detail to avoid unnecessarily obscuring descriptions of the embodiments of the invention.

In addition, throughout the specification and claims which follow, the term "container" is meant as a broad term that includes a variety of structures having an interior space sized to receive a variety of items, such as, but not limited to, electronics, optical, or other equipment that may be otherwise susceptible to damage if not properly packaged in the container. Further, the term "container" as used herein generally includes structurally rigid containers that may be stacked together. Accordingly, the term "stackable" generally refers to an array of protuberances and recesses located on a surface that when arranged together form a stackable surface that may be meshed, interlocked or otherwise engaged with a complementary stackable surface.

Figure 1:
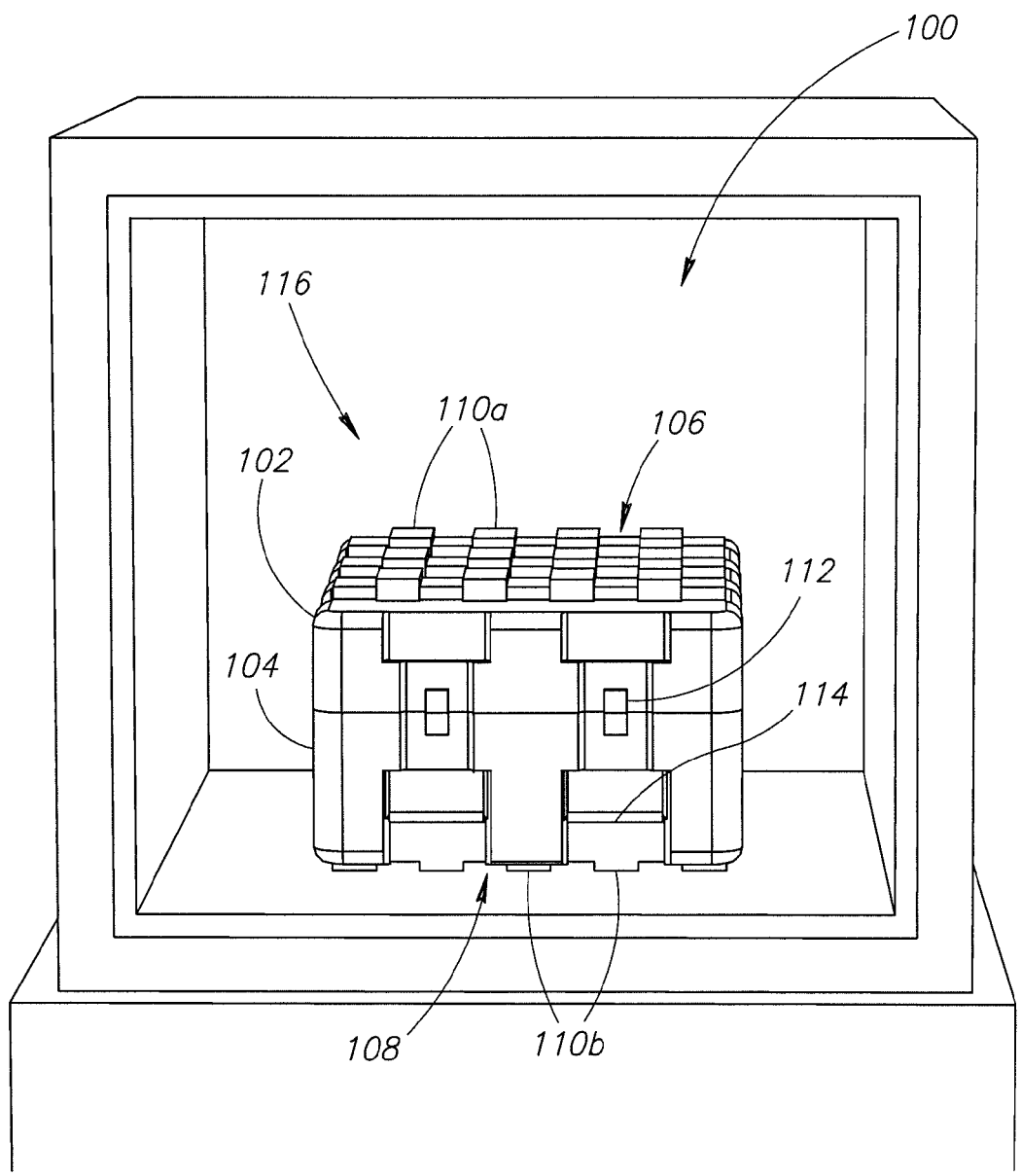
FIG. 1 shows a stackable equipment container having stacking elements located on a top surface and a bottom surface of the container according to an embodiment of the present invention.

FIG. 1 shows a stackable equipment container 100 having a top or upper portion 102 hingedly coupled to a bottom or lower portion 104. The top portion 102 includes a top surface 106 having top stackable elements 110a extending from the top surface 106 while the bottom portion 104 includes a bottom surface 108 having bottom, complementary stackable elements 110b extending from the bottom surface 108. Thus, when these types of containers 100 are stacked on top of one another, the top stackable elements 110a of the lower container mesh or otherwise engage with the bottom, complementary stackable elements 110b of the upper container. The top portion 102 and the lower portion 104 may be coupled together with latch mechanisms 112; however it is appreciated that other types of coupling mechanisms may be used to secure the top portion 102 to the bottom portion 104. In one embodiment, the container 100 may include handles 114 rotationally coupled to the sides of the container 100.

In one embodiment, the container 100 may take the form of a structurally rigid case 116 made from a linier low density polyethylene (LLDPE) material. In addition, the case 116 may be made from a rotomolding process such that the top portion 102 comprises a monolithic (i.e., unitary or singular) part and the bottom portion 104 comprises a monolithic part.

Figure 2:
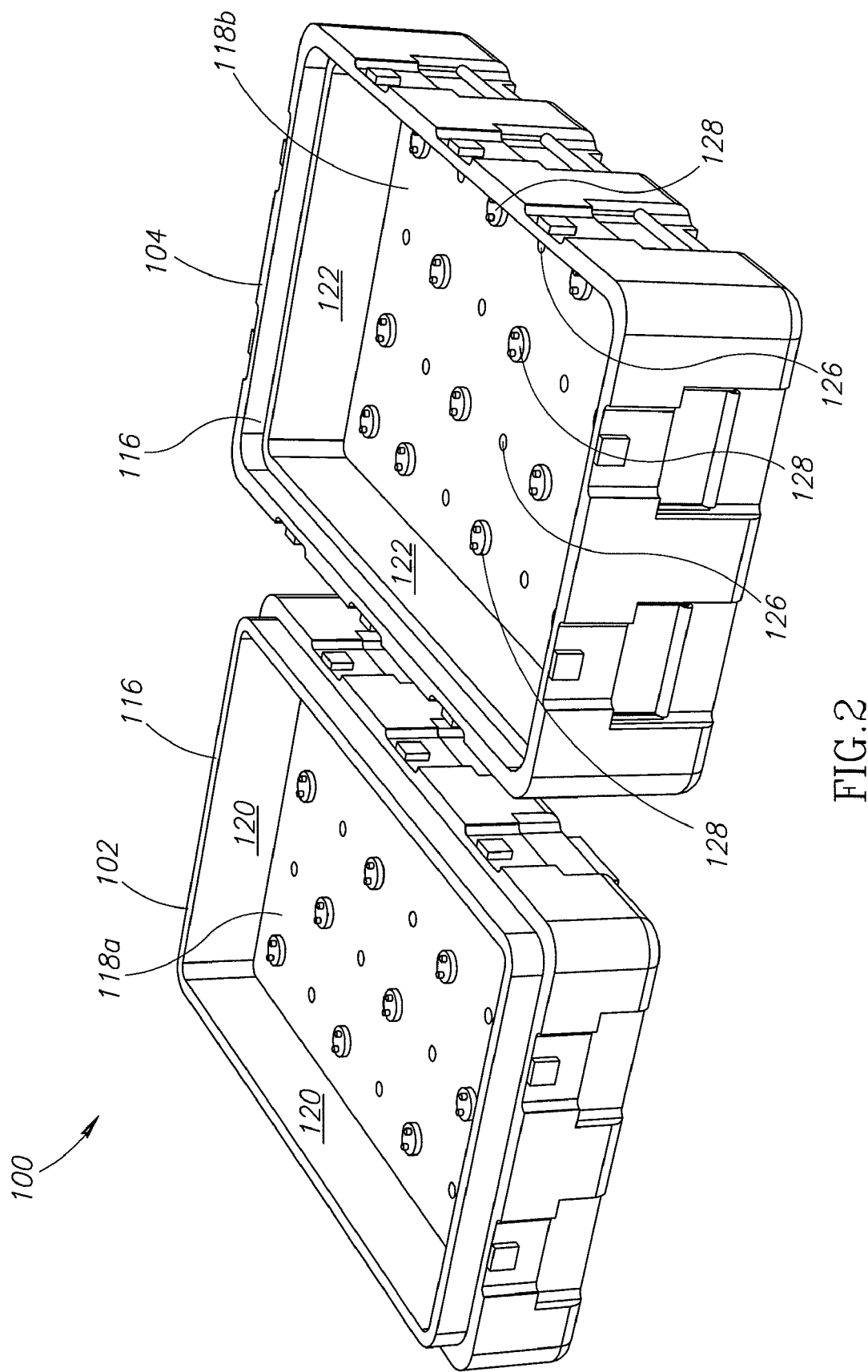
FIG. 2 shows the container of FIG. 1 having composite panels fastened to the top portion and bottom portion of the container using spin-weld plugs according to an embodiment of the present invention.

FIG. 2 shows the container 100 in an open configuration with the stackable elements 110a, 110b facing downward. In the illustrated embodiment, the container 100 takes the form of a structurally rigid case 116 as discussed above. As such, the case 116, without any reinforcement, may be susceptible to thermal or applied load deformation during its operational life. Therefore, one objective of the present invention is to strengthen or reinforce the top portion 102, the bottom portion 104 or both using a composite panel 118.

In the illustrated embodiment, the composite panel 118 may take the form of a fiber reinforced composite panel or sheet 118. More specifically, the composite panel 118 may take the form of a forty percent continuous glass strand reinforced polypropylene composite sheet. Preferably, two composite panels 118a, 118b may be used to strengthen the container 100 with a first composite panel 118a sized to be closely received by an inner perimeter surface 120 of the top portion 102 and a second composite panel 118b sized to be closely received by an inner perimeter surface 122 of the bottom portion 104. Although the illustrated embodiment shows composite panels 118a, 118b received by both the top and bottom portions 102, 104, it is appreciated that only one of these portions 102, 104 may be reinforced. The composite panels 118 include openings 126 for receiving spin-weld plugs 128. The composite panels 118a, 118b operate to add rigidity to the case 116, which equates to strengthening or reinforcing the case 116 to prevent or even eliminate deformation of the stackable elements 110a, 110b due to thermal, environmental or applied loading. In one embodiment, the strengthened case 116 may eliminate distortion of the stackable elements 110a, 110b even when the container 100 is subjected to temperatures in a range of about −40-160 degrees Fahrenheit.

Figure 3:
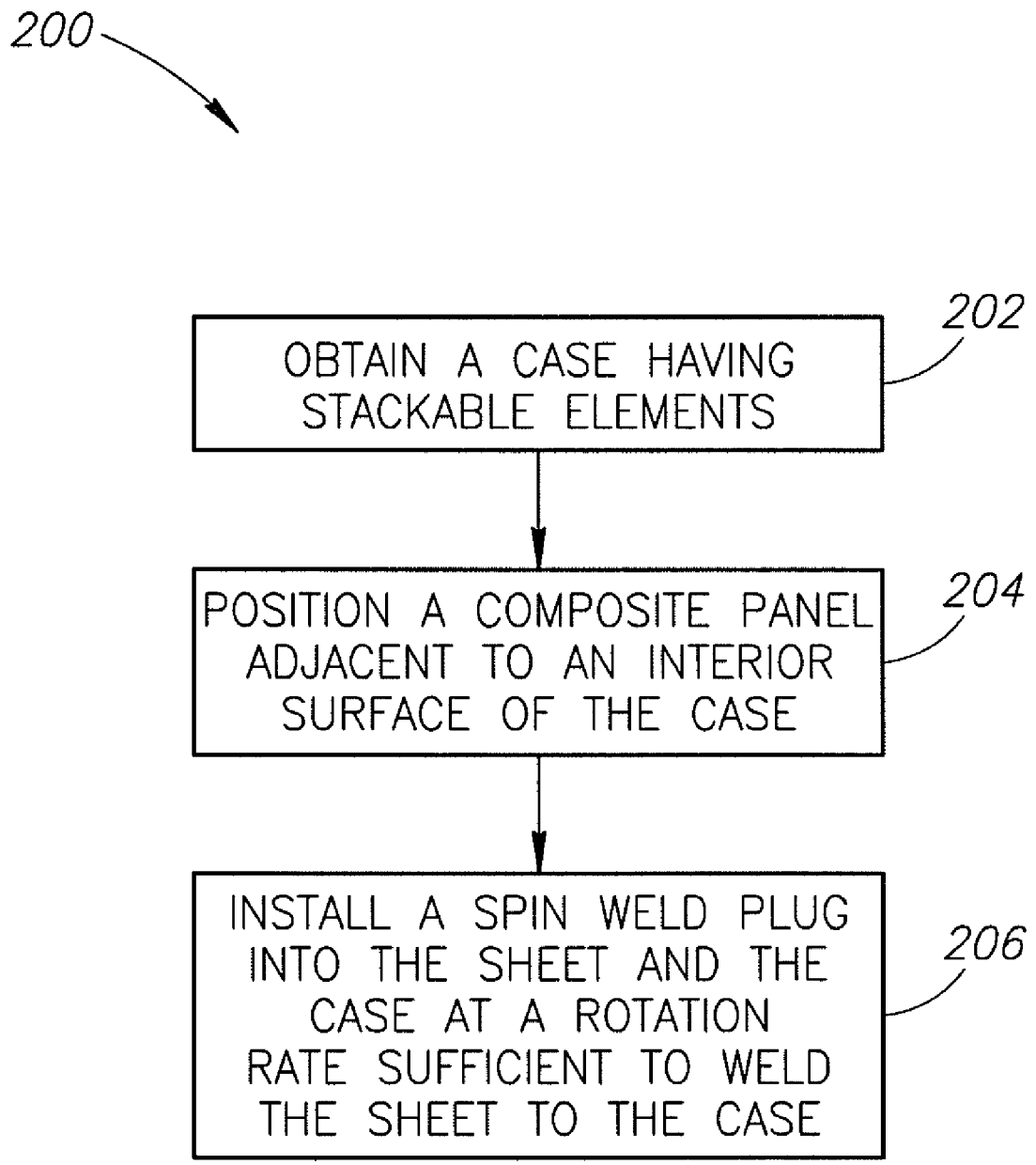
FIG. 3 shows a flow diagram for a method of strengthening a stackable equipment container according to an embodiment of the present invention.

Still referring to FIG. 2, but also referring to FIG. 3, a method 200 for installing the composite panels 118a, 118b to the case 116 includes the step 202 of obtaining a case 116 having stackable elements 110a, 110b. The case 116 may be placed in an open configuration as shown in FIG. 2. At step 204 and by way of example as shown in the illustrated embodiment, the composite panels 118a, 118b are received in the top portion 102 and the bottom portion 104, respectively.

At step 206, the spin-weld plugs 128 are installed into the composite panel 118 and the case 116 at a high rotation rate, which may be in a range of about 1200-2200 revolutions per minute (RPM), and preferably about 1800 RPM. Installing the spin-weld plugs 128 at such a rotation rate produces localized heating around the spin-weld plugs 128 causing the composite panel 118 and the case 116 to locally weld together as well as weld to the spin-weld plug 128. In one embodiment, the heat caused by the high rotation rate causes both the composite panel 118 and the case 116 to vulcanize. In addition, the composite panel 118 may be bonded to the case 116 before the spin-weld plugs 128 are installed.

FIGS. 4A-4C show one example of the spin-weld plug 128 that may be used to attach the composite panels 118a, 118b to the case 116. The spin-weld plug 128 includes a first body 130 coupled to a second body 132. The first body 130 has a first diameter 134 sized to be closely received in the openings 126 of the composite panel 118. The second body 132 has a second diameter 136 sized to cover the opening 126 and seat on the surface of the composite panels 118a, 118b. The spin-weld plug 128 includes a conical opening 138 located within the first body 130 and further includes tool engagement members 140 extending from the second body 132. In one embodiment, the spin-weld plug 128 is made from LLDPE.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method for strengthening a stackable equipment container, the method comprising:
    obtaining a case having a top portion with an exterior surface including a plurality of stackable elements and a bottom portion with an exterior surface including a plurality of complementary stackable elements;
    positioning at least one composite panel adjacent an interior surface of the case; and
    installing a plurality of spin-weld plugs into the panel and the case at a desired rotation rate sufficient to weld the panel to the case.

2. The method of claim 1, wherein obtaining the case includes obtaining a case made from a linier low density polyethylene material.

3. The method of claim 1, wherein positioning the at least one composite panel adjacent the interior surface of the case includes placing the panel against the interior surface of the top portion of the case.

4. The method of claim 1, wherein positioning the at least one composite panel adjacent the interior surface of the case includes placing the panel against the interior surface of the bottom portion of the case.

5. The method of claim 1, further comprising bonding the at least one composite panel to the case.

6. The method of claim 1, wherein installing the plurality of spin-weld plugs into the panel and the case at the desired rotation rate includes rotating the spin-weld plugs in a range of about 1200 to 2200 revolutions per minute.

7. The method of claim 1, wherein installing the plurality of spin-weld plugs into the panel and the case at the desired rotation rate includes rotating the spin-weld plugs at about 1800 revolutions per minute.

8. The method of claim 1, wherein installing the plurality of spin-weld plugs into the panel and the case at the desired rotation rate sufficient to weld the sheet to the case includes vulcanizing the panel to the case.

9. The method of claim 1, wherein positioning the at least one composite panel adjacent the interior surface of the case includes arranging the panel to provide a desired amount of stiffness to the case.

10. The method of claim 1, wherein positioning the at least one composite panel adjacent the interior surface of the case includes arranging the panel to substantially prevent distortion of a selected portion of the case when the case is subjected to temperatures in a range of about −0.65 to 185 degree Fahrenheit.

* * * * *